United States Patent
Kim et al.

(10) Patent No.: US 7,266,386 B2
(45) Date of Patent: Sep. 4, 2007

(54) METHOD FOR PERFORMING PACKET FLOODING AT WIRELESS AD HOC NETWORK

(75) Inventors: Ji-tae Kim, Suwon (KR); Myung-jong Lee, New York, NY (US); Chun-hui Zhu, New York, NY (US)

(73) Assignee: Samsung Electronics Co., Ltd., Suwon-si (KR)

( * ) Notice: Subject to any disclaimer, the term of this patent is extended or adjusted under 35 U.S.C. 154(b) by 694 days.

(21) Appl. No.: 10/817,926

(22) Filed: Apr. 6, 2004

(65) Prior Publication Data

US 2004/0218557 A1 Nov. 4, 2004

Related U.S. Application Data

(60) Provisional application No. 60/466,430, filed on Apr. 30, 2003.

(30) Foreign Application Priority Data

Jan. 16, 2004 (KR) .................. 10-2004-0003200

(51) Int. Cl.
- *H04M 1/00* (2006.01)
- *H04B 1/04* (2006.01)
- *H04Q 7/20* (2006.01)

(52) U.S. Cl. .................. 455/522; 455/127.1; 455/445; 370/328; 370/338

(58) Field of Classification Search ............. 455/445, 455/446, 447, 448, 449, 452.1, 453, 127.1–127.5, 455/522; 370/237, 328, 338, 238
See application file for complete search history.

(56) References Cited

U.S. PATENT DOCUMENTS 6,940,832 B2* 9/2005 Saadawi et al. ............ 370/328

2003/0161268 A1* 8/2003 Larsson et al. ............. 370/229
2004/0174825 A1* 9/2004 Li et al. ..................... 370/254

OTHER PUBLICATIONS

Yumiko Kitagishi, et al., "Packet relay Control Scheme Based on Priority Regions in Multihop Wireless Networks", vol. J85-B, No. 12, pp. 2119-2128, 2002.

* cited by examiner

*Primary Examiner*—Tony T. Nguyen
(74) *Attorney, Agent, or Firm*—Sughrue Mion, PLLC

(57) ABSTRACT

A method for packet re-flooding in a wireless ad hoc network for transmitting a broadcast packet from a source node to a destination node. In order to determine the respective nodes received with the broadcast packet from the source node into a certain number of power levels in accordance with the receiving power of the signal carrying the received packet, the packet re-flooding method includes the steps of setting a power level reference by which the power level increases as the receiving power increases, obtaining the receiving power of the signal carrying the packet received from the respective nodes but not the source node, determining power levels based on the power level reference and the obtained receiving power, calculating a back-off delay time in accordance with the power levels of the respective nodes but not the source node, and re-flooding the received packet when the calculated back-off delay time of the respective nodes excluding the source node expires and when the received packet is the first packet that is received. Accordingly, the possibility of having collisions due to re-flooding of the respective nodes is reduced, and also, overall power consumption of the network decreases.

8 Claims, 4 Drawing Sheets

METHOD FOR PERFORMING PACKET FLOODING AT WIRELESS AD HOC NETWORK

CROSS-REFERENCE TO RELATED APPLICATIONS

This application claims benefit of U.S. Provisional Patent Application No. 60/466,430 filed Apr. 30, 2003 in the U.S. Patent and Trademark Office, the disclosure of which is incorporated herein by reference.

BACKGROUND

1. Field of the Invention

The present invention relates to a method for performing packet flooding for transferring a broadcast packet from a source node to a destination node, and more particularly, to a method for performing packet flooding which enables efficient communication with a reduced requirement for network resources, by giving a first opportunity to a node at a predetermined distance to the source node to perform flooding of the packet from the source node.

2. Description of the Related Art

With the development of mobile communication devices and technologies, the demand for a small-scale wireless communication network other than an existing infrastructure network has risen. The small-scale wireless communication network is especially demanded in areas such as inside of a building or in a mountain, where wired equipment is difficult to install. A wireless ad hoc network is one example of a small-scale wireless communication network.

Unlike an infrastructure network, a wireless ad hoc network does not have a separate router for packet transmission and reception, and the respective nodes serve the role of either the host or the router. In a wireless ad hoc network, each node is equipped with a wireless communication device, and is movable. Accordingly, there is no fixed topology for a wireless ad hoc network.

In a wireless ad hoc network, due to limited transmission range of the wireless frequency of the respective nodes, packets from the source do not always reach the destination directly. In this case, the packets are transmitted to the destination via a plurality of nodes operating as a router. This is called 'multihop', and the wireless ad hoc network needs a routing protocol for the realization of a 'multihop' scheme.

Furthermore, because all the nodes share one data channel in the wireless ad hoc network, channel collision needs to be prevented, and to this end, many schemes have been suggested to prevent channel collision. One popular method among the channel collision schemes is the CSMA/CA (Carrier Sense Multiple Access/Collision Avoidance), which is one of the MAC (media access control) layer protocols. The current Wireless LAN standard (described by IEEE 802.11) is one of its applications.

The CSMA/CA is the collision avoidance scheme based on the sensing of a carrier in the wireless net. According to the CSMA/CA, each node transmits a confirmation signal and starts transmitting the packets only after confirming that there would be no collision. This means that, if the plurality of nodes want to transmit packets in the network, the nodes have to transmit a plurality of confirmation signals to see if there would be no collision. Accordingly, the transmission is delayed.

According to the CSMA/CA, when a collision occurs in the network because more than one node concurrently attempt to transmit the packets using the data channel, the nodes delay packet transmission for a random period of time and attempt re-transmission later. Then upon detecting another collision, nodes delay the packet transmission two times as long as the previous delay time, and attempt re-transmission.

Accordingly, collisions more frequently occur in a complex network, delaying packet transmission of the nodes and subsequently delaying the overall transmission in the network. Power consumption of the network also increases. The collision at the MAC layer also impedes finding out the optimum route in the upper layer routing protocol.

Unlike the conventional wired network which is based on point-to-point communication, in the wireless ad hoc network, communication is carried out in the broadcasting/flooding way. That is, most of the wireless nodes transmit packets omnidirectionally to the neighboring wireless nodes, and all the neighboring nodes receiving the packets re-flood the packets. This type of flooding will be hereinafter called a 'conventional flooding'.

FIG. 1 is a view for illustrating a collision and overlaying of flooding in the conventional ad hoc network. In FIG. 1, an exemplary wireless ad hoc network is constructed of a plurality of nodes 100, 110, 120, 130. The node 100 is a source node, and the other nodes 110, 120, 130 are neighboring nodes of the source node 100.

According to the conventional flooding, in order to ensure the widest packet receiving range possible, all the nodes first receiving the packet re-flood the received packets. As the neighboring nodes of the broadcasting node, which is the source node, try to use the shared channel to re-flood the received nodes at the same time, there occur frequent collisions.

Referring to FIG. 1, the neighboring nodes 110, 120, 130 are within the frequency transmission coverage 100' of the source node 100, and accordingly receive the broadcast packets from the source node 100. If it is the first packet that they receive, all the neighboring nodes 110, 120, 130 attempt the re-flooding of the received packet using the shared channel almost simultaneously. However, none of the neighboring nodes 110, 120, 130 can perform re-flooding if there occurs a collision.

The network having nodes in higher density have more serious problems. That is, the greater the number of neighboring nodes of the source node, the more collisions that occur.

As shown in FIG. 1, the transmission coverage of the respective nodes overlay one another repeatedly. Accordingly, the same packet is re-flooded from the neighboring nodes of the source node unnecessarily many times, resulting in waste of network resources. In other words, as the same packets are re-flooded from the neighboring nodes 110, 120, 130 repeatedly in the coverage overlaying area of the respective nodes 110, 120, 130, the network resources are wasted.

Further, if collisions occur due to repetitive attempts of re-flooding, the respective neighboring nodes have to delay the packet transmission for a random period of time until the re-transmission. As a result, packet transmission is delayed, and power consumption of the respective nodes increases.

SUMMARY

An object of the invention is to solve at least the above problems and/or disadvantages and to provide at least the advantages described hereinafter.

Accordingly, one aspect of the present invention provides a method for performing packet flooding for a wireless ad hoc network, which enables efficient communication with reduced requirement for network resources, by giving nodes at a predetermined distance to the source node a first opportunity to perform the flooding of the packet received from the source node.

In order to accomplish the above aspect and/or other features of the present invention, a method for performing packet re-flooding in a wireless ad hoc network comprises the steps of determining a power level reference so that a node receiving a broadcast packet from a source node is assigned a predetermined number of power levels in accordance with a receiving power of a signal carrying the received packet; each node, except the source node, obtaining the receiving power of the signal carrying the received packet; determining the power level based on the power level reference, in accordance with the receiving power as obtained; calculating a back-off delay time in accordance with the power level determined by the each node, except the source node; and when the back-off delay time calculated by the each node, except the source node, expires, and the received packet is the first packet that is received, re-flooding the received packet.

The step of setting the power level reference comprises the steps of obtaining a transmission power of the source node, and a minimum acceptable receiving power of the each node, except the source node; calculating a distance between a denary logarithmic value of the transmission power of the source node and a denary logarithmic value of the maximum acceptable receiving power of the each node except the source node; and calculating a range of a power level reference by dividing the calculated distance by the number of power levels, and setting the power level reference in accordance with the calculated range of power level reference.

The power level reference setting step comprises the steps of obtaining a minimum acceptable receiving power of each node, except the source node; and obtaining a difference by subtracting a denary logarithmic value of the minimum acceptable receiving power from a denary logarithmic value of the receiving power of each node except the source node, dividing the difference by a logarithmic value of a number of power levels, and determining the power level based on the resultant value of the division and the set power level reference.

The back-off delay time calculating step comprises the steps of obtaining a size of the received packet from each node except the source node, and also a maximum transmission capacity of each node; calculating a packet transmission time by dividing the size of the packet of each node except the source node, by the maximum transmission capacity; and calculating the back-off delay time by obtaining a difference of subtracting 1 from the determined power levels and multiplying the difference by the calculated packet transmission time and a number greater than 1.

In the packet re-flooding step, each node, except the node of the highest power level, does not perform re-flooding the received packet even when the calculated back-off delay time expires.

When the receiving power of each node except the source node is equal to, or smaller than a predetermined threshold, the packet re-flooding step further comprises the step of re-flooding the received packet even when the packet is not a first packet that is received.

When a node receives a packet which is re-flooded by one of the nodes but not of the source node, and when the receiving power of the signal carrying the received packet is equal to, or smaller than a predetermined threshold, the packet re-flooding step further comprises a packet re-flooding step in which the received packet is re-flooded even when the received packet is not the first packet that is received.

When a node receives a packet which is re-flooded by at least two nodes of the nodes but not of the source node, further comprising the step of re-flooding the received packet even when the received packet is not the first packet that is received.

BRIEF DESCRIPTION OF THE DRAWINGS

The above objects and other features of the present invention will become more apparent by describing in detail an exemplary embodiment thereof with reference to the attached drawings, in which.

DETAILED DESCRIPTION OF NON-LIMITING EXEMPLARY EMBODIMENTS

Hereinafter, the present invention will be described in detail with reference to several preferred embodiments and the accompanying drawings.

Figure 1:
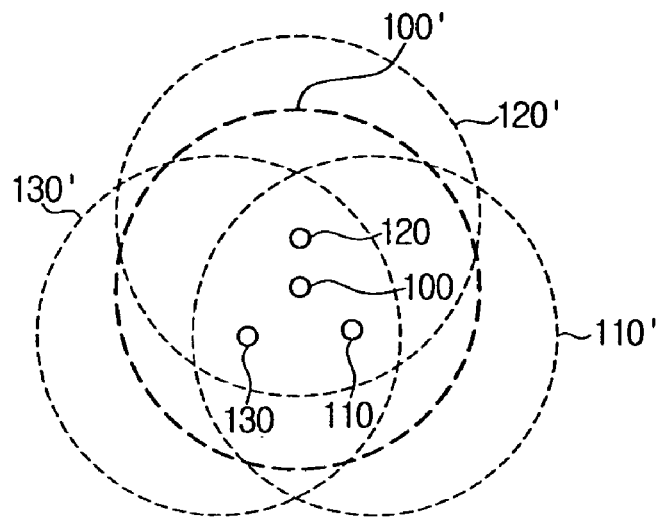
FIG. 1 is a view illustrating a conventional ad hoc network to explain problems of collisions and overlaying flooding.
Figure 2:
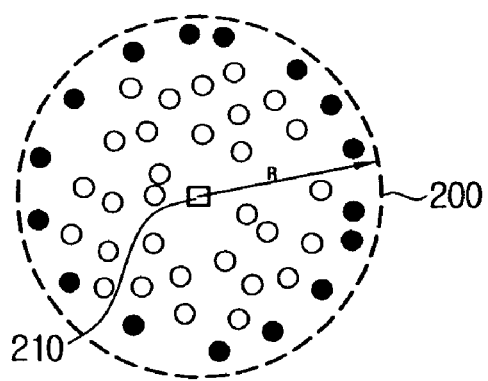
FIG. 2 is a view illustrating a method for performing a packet flooding in an ad hoc network according to an exemplary embodiment of the present invention.

FIG. 2 is a view of an ad hoc network, for illustrating a method for performing packet flooding according to an exemplary embodiment of the present invention.

In FIG. 2, there are plural black or white dots within a circle 200. The circle 200 corresponds to the transmission range R of a source node 210.

If all the nodes within the circle 200, i.e., within the transmission range R perform the packet flooding, problems such as overlaying flooding, collisions and delay in transmission occur. Conventionally, all the neighboring nodes of the source node perform the packet flooding if the packet they received from the source node is the first packet. Accordingly, packets are repeatedly transmitted in transmission ranges of the neighboring nodes which are overlaying many times. If this occurs, collisions and subsequent transmission delay occur, and accordingly, network resources are wasted. Accordingly, in order to prevent wastage of network resources, there is a need to prevent overlaying of the frequency transmission ranges of the neighboring nodes in terms of space and time.

According to an aspect of the present disclosure, instead of performing packet flooding simultaneously, the nodes (black dots of FIG. 2) positioned in near to the border of the circle 200 are given the first opportunity to perform the packet flooding. Hereinbelow, the nodes near the border of the circle 200 will be called 'border nodes'. That is, all nodes within the frequency transmission range R of the node performing packet flooding do not necessarily always perform the packet re-flooding.

Referring to FIG. 2, inside of the circle 200 refers to the frequency transmission coverage of the source node 210, while the border nodes cover the outside of the circle 200 for frequency transmission. The outside of the circle 200 may also be covered by frequency transmission ranges of the other nodes inside the circle 200, but still, the border nodes have the wider frequency transmission coverage.

The method for determining the border nodes among the nodes inside the circle 200 will be described.

It is true that the signal power gets weaker as it moves farther away from the source node. Accordingly, the receiving power of the border nodes is weaker than the receiving power of any node inside the circle 200. This is especially true if nodes operate in free space without barriers. Accordingly, by measuring the receiving power of the signal being received at the respective nodes, the border nodes can be determined.

Measuring the receiving power of the signal carrying the received packets can also be used to determine a back-off delay time, in which one node has to wait from the reception of the broadcast packet from the source node until the node performs the packet re-flooding. In other words, by scheduling the back-off delay time of the border nodes to be longer with respect to the higher receiving power, the border nodes can perform the re-flooding of the received packet after a relatively shorter period of time than the other nodes within the circle 200.

Accordingly, when one node inside the circle 200 receives the same packet at least twice, the node does not perform the re-flooding anymore. More specifically, when a node receives a packet from the source node and then receives the same packet a second time re-flooded from a border node, the node does not perform the re-flooding of the packet from the border node, because the same packet was received earlier. Because only the nodes at the border may perform re-flooding while many others do not, less collision occurs and less power is consumed.

The method for measuring the receiving power of the received signal, dividing the measured receiving power into certain power levels and determining the border nodes according to the power levels, and scheduling the back-off delay time for each node, will be described below.

On receiving the packet, each node measures the receiving power of the signal that carries the packet, and quantifies the power signal into different power levels, for example, into 8-bit 256 levels. By using a rough logarithmic fashion for the receiving power, and converting the lower signal values using more bits, it is ensured that low signals are well represented as well as the high signals.

Receiving power becomes weaker as the signal moves farther away from the source node. However, it can be set such that the power level according to the receiving power may become higher as it is farther away from the source node. Accordingly, the border node may be determined to be the node of the highest power level. In the above example, the border node will be determined to be in level 1.

After the power level of the node is calculated, the back-off delay time for the node is calculated. For example, if the node falls into level 10 among 256 power levels, the back-off delay time can be calculated by $10 \times (5 \times 10^{-5}) = 5 \times 10^{-4}$ seconds, where $5 \times 10^{-5}$ seconds is a predetermined time value.

According to the above example, the back-off delay time becomes shorter as the power level decreases. Accordingly, the nodes at the border, which have lower receiving power, have a shorter back-off delay time than those closer to the center of the circle 200, and thus can perform flooding prior to the nodes closer to the center of the circle 200.

In setting back-off delay times, the interval between any two consecutive back-off slots must be long enough for a first node to finish re-flooding a packet while a second node with a power level one level lower does not start re-flooding until the first node finishes the re-flooding.

Otherwise, the node receiving the relatively high-powered signal will try to re-flood the packet while the node receiving the relatively low-powered signal is still re-flooding, thereby causing collisions. The packet size and maximum amount of transmission of the node have to be taken into account in determining the back-off delay time for different slots.

According to the present disclosure, because the nodes closer to the center of the circle 200 do not perform re-flooding unlike in the conventional cases where all the nodes perform re-flooding of a received packet, the transmission coverage range of the entire re-flooding needs to be extended as much as possible to ensure the best packet reception of the outside nodes of the circle 200, and the following are three methods that are offered as options.

First, it can be set such that nodes with receiving power under a certain threshold may re-flood the packet. Accordingly, not only the nodes at the border but also some nodes closer to the center of the circle 200 re-flood the packet, and the entire transmission coverage of the overall re-flooding can be extended.

Second, if a node receives a weak re-flooding signal from the neighboring nodes, the node then may re-flood the packet re-floods the packet. The fact that a node receives a weak re-flooding signal means that the re-flooding node is far away from the packet-receiving node. Because the packet-receiving node also performs re-flooding the packet, the transmission coverage of the overall re-flooding can be extended.

Figure 3:
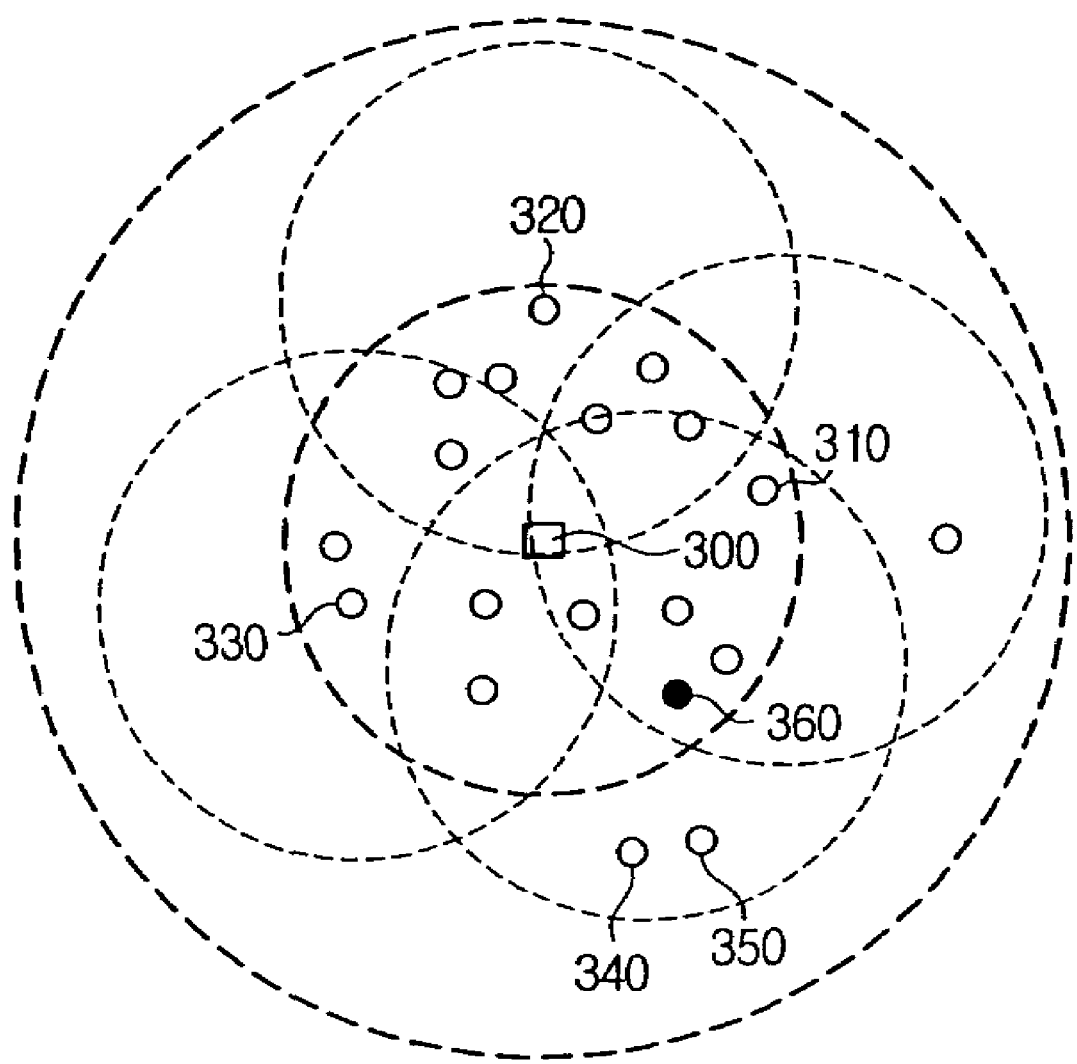
FIG. 3 is a view illustrating a method for extending a frequency transmission coverage with the entire flooding according to an exemplary embodiment of the present invention.

Lastly, before a node's back-off delay time expires, if a node has received more than one re-flooding signal, the node then re-floods the packet even though the signal the node received directly from the original source node was strong. FIG. 3 is a view for illustrating this third method of extending transmission range of the overall re-flooding.

When more than one re-flooding signal is received, it means that the received signals are not from the same direction. According to the present invention, as the border nodes perform re-flooding, the re-flooding at the neighboring nodes is suppressed. Accordingly, the receiving node realizes that the re-flooding node is considerably far away from the packet-receiving node in a different direction than the source node. As the receiving node performs re-flooding of the packet, the transmission coverage of the entire re-flooding can be extended to more of the neighborhood.

Referring to FIG. 3, one node 360 is close to a source node 300, and therefore, the one node 360 has a high receiving power. However, because the one node 360 receives re-flooding signals from the two border nodes 310, 330, the one node 360 performs re-flooding of the packet. As shown, the one node 360 is far from the two border nodes 310, 330 and by the packet re-flooding of the one node 360, the frequency transmission range of the entire re-flooding is extended to the nodes 340, 350 in the neighborhood.

Figure 4A:
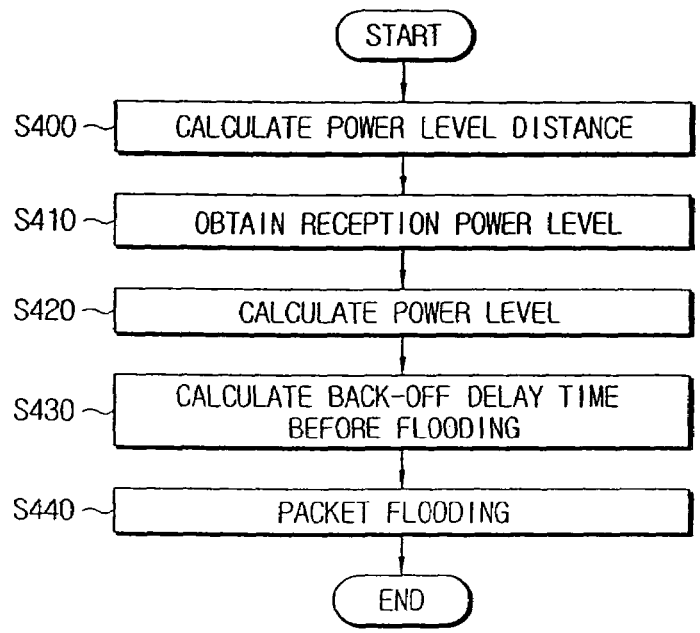
FIGS. 4A to 4C are flowcharts for illustrating a method of packet flooding in a wireless ad hoc network according to an exemplary embodiment of the present invention.

FIG. 4A is a flowchart illustrating a packet re-flooding method in a wireless ad hoc network according to an exemplary embodiment of the present invention.

Referring to FIG. 4A, certain reference power levels are set in a manner such that the power level increases as the receiving power increases (S400). The plural reference power levels are set in order to divide the respective nodes to corresponding power levels in accordance with the receiving powers of the signals received from the source node. For example, the power levels can be set to 64 power levels.

Figure 4B:
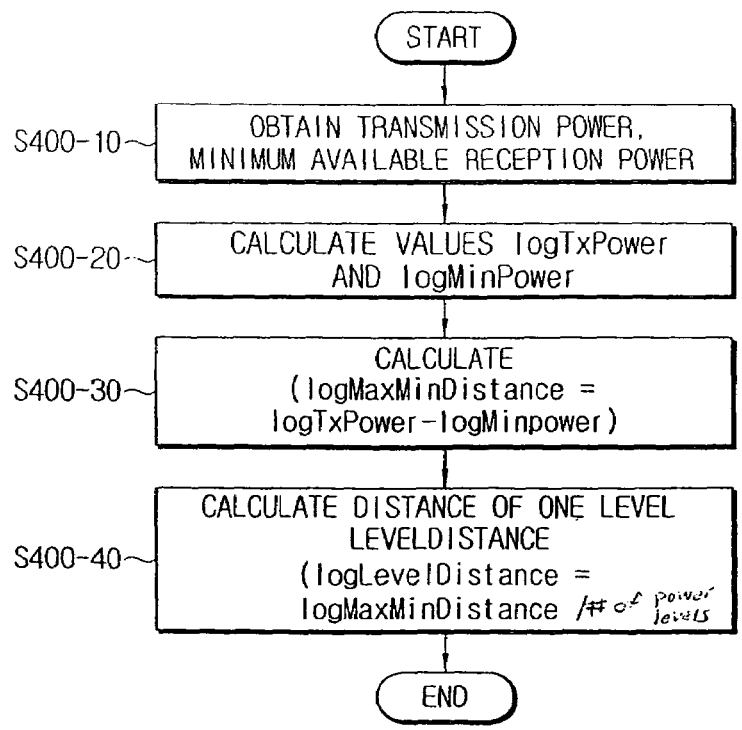

FIG. 4B is a flowchart illustrating the process of dividing the power levels in greater detail. In order to divide the power levels, first, the respective nodes obtain a transmission power TxPower of the source node and the minimum acceptable receiving power MinPower (S400-10). The transmission power TxPower of the wireless node and the minimum acceptable receiving power MinPower of the receiving node are obtainable information. Through the denary logarithmic with respect to the transmission power TxPower and the minimum acceptable receiving power MinPower, values "logTxPower" and "logMinPower" are obtained (S400-20), and then the logarithmic distance between the two values "logTxPower" and "logMinPower" is obtained, i.e., logTxPower−logMinPower =logMaxMinDistance (S400-30).

Next, the difference value logMaxMinDistance is divided by the number of power levels and then a common log function logLevelDistance of a reference width of one power level, i.e., the distance of one level LevelDistance is calculated (S400-40). Assuming the number of power levels to be 64 levels in the above example, the above can be expressed by the following equation:

$$\log LevelDistance = \frac{\log MaxMinDistance}{64} \quad \text{[Equation 1]}$$

The power levels can start from the transmission power TxPower as a level 1 and be incremented by an interval corresponding to the calculated reference logarithmic distance logLevelDistance of one power level so that a power level is established for each receiving power level.

For example, with 64 power levels, 7.1 logarithmic receiving power logRxPower, and 0.1 reference logarithmic distance logLevelDistance, the power level 64 of the receiving power falls between 7.0 and 7.1, the power level 63 between 6.9 and 7.0, and so on, and finally, the power level 1 falls between 0.7 and 0.8.

After each power level reference is set, the receiving power RxPower of the respective nodes is obtained (S410). The receiving power RxPower is a receiving power of the signal that carries the received packet, and may vary whenever the respective nodes move.

Next, the power levels of the nodes are determined in accordance with the obtained receiving power RxPower (S420). To this end, the minimum acceptable receiving power MinPower is obtained, and the minimum acceptable receiving power MinPower is subtracted from a denary logarithmic value logRxPower of the receiving power RxPower. Then by dividing the difference of the minimum acceptable receiving power MinPower and the denary logarithmic value logRxPower of the receiving power RxPower by a denary logarithmic value of the number of power levels, a value RtCal is obtained. This can be expressed by the following equation 2:

$$RtCal = \frac{\log RxPower - \log MinPower}{\log LevelDistance} \quad \text{[Equation 2]}$$

Determining the power levels of the respective nodes based on the power level reference determined as above and according to the receiving power, the power level which the value RtCal belongs to is the power level of the node. In the above example, if the value RtCal is 1.23, which is between 1.2 and 1.3, the power level of the node is determined to be power level 6.

Figure 4C:
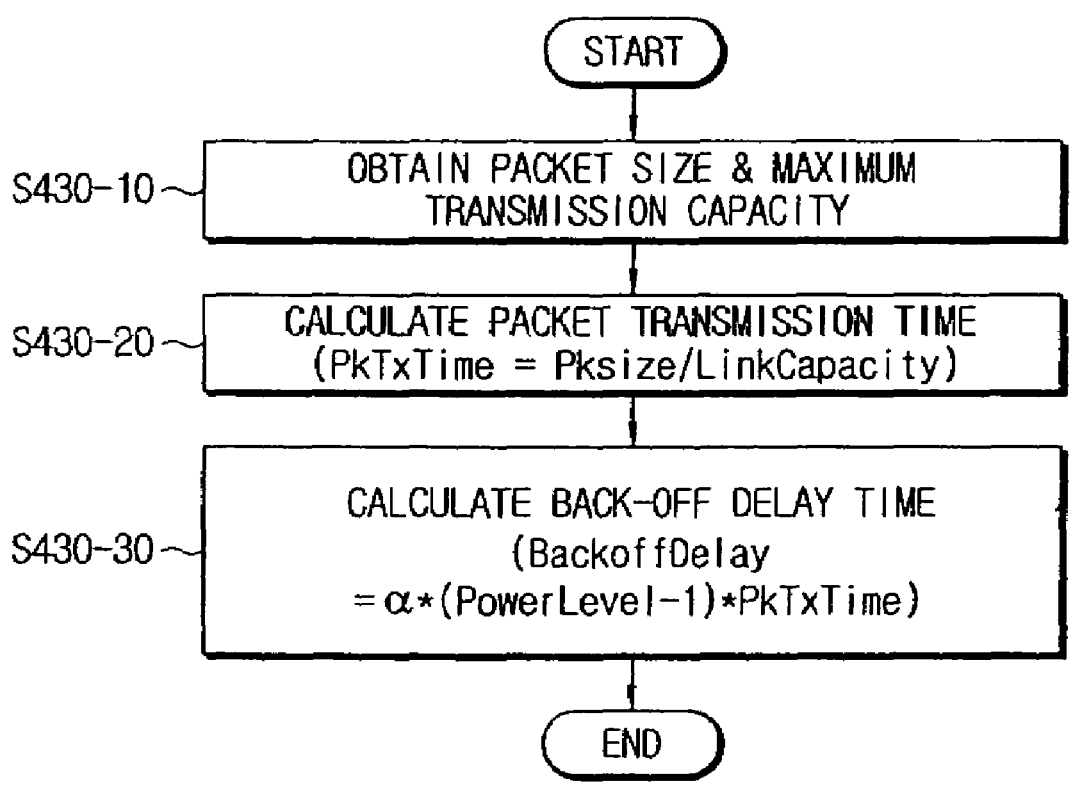

Next, a back-off delay time of the respective nodes is calculated (S430)(FIG. 4A). The packet size and minimum transmission capacity are obtained (Step 410, FIG. 4C). Then the packet transmission time PkTxTime is calculated (S430-20). The packet transmission time PkTxTime can be calculated by dividing the packet size PkSize by the maximum link capacity LinkCapacity of the node.

Next, the back-off delay time is calculated by subtracting '1' from the power level PowerLevel, multiplying the calculated distance by the packet transmission time PkTxTime, and then multiplying the resultant value by a predetermined value α (S430-30). The "predetermined value α" refers to a value, which is added to the packet transmission time of a higher level node, in order to ensure that the higher level node finishes re-flooding a packet before the back-off delay time of a lower level node expires. The predetermined value a can be randomly selected among numbers greater than '1'.

If the respective nodes do not receive re-flooded packets from the other nodes except the source node by the time that the calculated back-of delay time expires, the nodes re-flood the packet after the back-off delay time (S440). The packet re-flooding may additionally adopt one among the above-described three methods for extending the transmission range of the entire re-flooding.

According to the present invention, some nodes receiving a packet from a source node in a wireless ad hoc network re-flood the received packet. Accordingly, compared to the conventional case in which all the nodes receiving the packet perform the re-flooding, the possibility of having collision is greatly reduced and the power consumption of the overall network also decreases.

Further, because the receiving power is divided into a predetermined number of power levels in accordance with the receiving power of the received packet, and a node farthest from the source node is given the first opportunity to perform the re-flooding based on the back-off delay time calculated in accordance with the respective power levels, the possibility of collision is greatly reduced, packet transmission speed increases and network resources are saved.

Finally, thanks to adaptability to the variation of the network according to the present invention, there is no requirement for information on the network topology, and periodical re-flooding for information exchange with the neighboring nodes is not necessary any more.

Although a few preferred embodiments of the present invention have been described, it will be understood by those skilled in the art that the present invention should not be limited to the described preferred embodiments, but various changes and modifications can be made within the spirit and scope of the present invention as defined by the appended claims.

What is claimed is:

1. A method for performing packet re-flooding in a wireless ad hoc network including a plurality of nodes, comprising:

establishing a power level reference so that each of the plurality of nodes, other than a source node, receiving a broadcast packet from the source node is assigned a predetermined number of power levels corresponding to a receiving power of a signal carrying the received packet;

each of the plurality of nodes, except the source node, obtaining the receiving power of the signal carrying the received packet, respectively;

establishing one of the power levels as a respective power level of each of the plurality of nodes based on the power level reference, in accordance with the receiving power as obtained;

calculating a back-off delay time in accordance with the power level established for each of the plurality of nodes, except the source node; and when the back-off delay time of a respective one of the plurality of nodes, except the source node, expires, and the received packet is not identical to a packet previously received by the respective one of the plurality of nodes, the respective one of the plurality of nodes re-floods the received packet.

2. The packet re-flooding method of claim 1, wherein the step of establishing the power level reference comprises:

obtaining a transmission power of the source node, and a minimum acceptable receiving power of each of the plurality of nodes, except the source node;

calculating a distance between a denary logarithmic value of the transmission power of the source node and a denary logarithmic value of the maximum acceptable receiving power of the each of the plurality of nodes except the source node; and calculating a range of the power level reference by dividing the calculated distance by the number of power levels, and setting the power level reference in accordance with the calculated range of the power level reference.

3. The packet re-flooding method of claim 1, wherein the step of establishing one of the power levels comprises:

obtaining a minimum acceptable receiving power of each of the plurality of nodes, except the source node; and obtaining a difference by subtracting a denary logarithmic value of the minimum acceptable receiving power from a denary logarithmic value of the receiving power of each of the plurality of nodes except the source node, dividing the difference by a logarithmic value of a number of power levels, and determining the power level of the plurality of nodes except the source node based on the resultant value of the division and the established power level reference.

4. The packet re-flooding method of claim 1, wherein the back-off delay time calculating step comprises:

obtaining a size of the received packet from each of the plurality of nodes except the source node, and also a maximum transmission capacity of each of the plurality of nodes;

calculating a packet transmission time by dividing the size of the packet of each of the plurality of nodes except the source node, by the maximum transmission capacity; and calculating the back-off delay time by obtaining a difference of subtracting 1 from the established power levels and multiplying the difference by the calculated packet transmission time and a number greater than 1.

5. A method for performing packet re-flooding in a wireless ad hoc network including a plurality of nodes, comprising:

establishing a power level reference so that each of the plurality of nodes, other than a source node, receiving a broadcast packet from the source node is assigned a predetermined number of power levels corresponding to a receiving power of a signal carrying the received packet;

each of the plurality of nodes, except the source node, obtaining the receiving power of the signal carrying the received packet, respectively;

establishing one of the power levels as a respective power level of each of the plurality of nodes based on the power level reference, in accordance with the receiving power as obtained;

calculating a back-off delay time in accordance with the power level established for each of the plurality of nodes, except the source node; and when the back-off delay time of a respective one of plurality of nodes, except the source node, expires, and the received packet is not identical to a packet previously received by the respective one of the plurality of nodes, the respective one of the plurality of nodes re-floods the received packet only if the respective one of the plurality of nodes is the node having a lowest power level of the plurality of nodes.

6. A method for performing packet re-flooding in a wireless ad hoc network including a plurality of nodes, comprising:

establishing a power level reference so that each of the plurality of nodes, other than a source node, receiving a broadcast packet from the source node is assigned a predetermined number of power levels corresponding to a receiving power of a signal carrying the received packet;

each of the plurality of nodes, except the source node, obtaining the receiving power of the signal carrying the received packet, respectively;

establishing one of the power levels as a respective power level of each of the plurality of nodes based on the power level reference, in accordance with the receiving power as obtained;

calculating a back-off delay time in accordance with the power level established for each of the plurality of nodes, except the source node; and when the back-off delay time of a respective one of the plurality of nodes, except the source node, expires, and when the receiving power of the respective one of the plurality of nodes is equal to, or smaller than a predetermined threshold, the respective one of the plurality of nodes re-floods the received packet.

7. A method for performing packet re-flooding in a wireless ad hoc network including a plurality of nodes, comprising:

establishing a power level reference so that each of the plurality of nodes, other than a source node, receiving a broadcast packet from the source node is assigned a predetermined number of power levels corresponding to a receiving power of a signal carrying the received packet;

each of the plurality of nodes, except the source node, obtaining the receiving power of the signal carrying the received packet, respectively;

establishing one of the power levels as a respective power level of each of the plurality of nodes based on the power level reference, in accordance with the receiving power as obtained;

calculating a back-off delay time in accordance with the power level established for each of the plurality of nodes, except the source node; and when the back-off delay time of a respective one of the plurality of nodes, except the source node, expires, and the received packet is not identical to a packet previously received by the respective one of the plurality of nodes, the respective one of the plurality of nodes re-floods the received packet, except that when the respective node receives a packet that is re-flooded by one of the plurality of nodes other than the source node and when the receiving power of the signal carrying the received packet is equal to, or smaller than a predetermined threshold, the respective one of the plurality of nodes re-floods the received packet even when the received packet is identical to the packet previously received.

8. A method for performing packet re-flooding in a wireless ad hoc network including a plurality of nodes, comprising:

establishing a power level reference so that each of the plurality of nodes, other than a source node, receiving a broadcast packet from the source node is assigned a predetermined number of power levels corresponding to a receiving power of a signal carrying the received packet;

each of the plurality of nodes, except the source node, obtaining the receiving power of the signal carrying the received packet, respectively;

establishing one of the power levels as a respective power level of each of the plurality of nodes based on the power level reference, in accordance with the receiving power as obtained;

calculating a back-off delay time in accordance with the power level established for each of the plurality of nodes, except the source node; and when the back-off delay time of a respective one of the plurality of nodes, except the source node, expires, and the received packet is not identical to a packet previously received by the respective one of the plurality of nodes, the respective one of the plurality of nodes re-floods the received packet, except that when the respective one of the plurality of nodes receives a packet which is re-flooded by at least two of the plurality of nodes but not the source node, the respective one of the plurality of nodes re-floods the received packet even when the received packet is identical to the packet previously received.

* * * * *